Feb. 1, 1966  A. C. WINTERHALTER  3,233,244
APPARATUS FOR REPRODUCING SEISMIC RECORDS
Filed Aug. 11, 1961
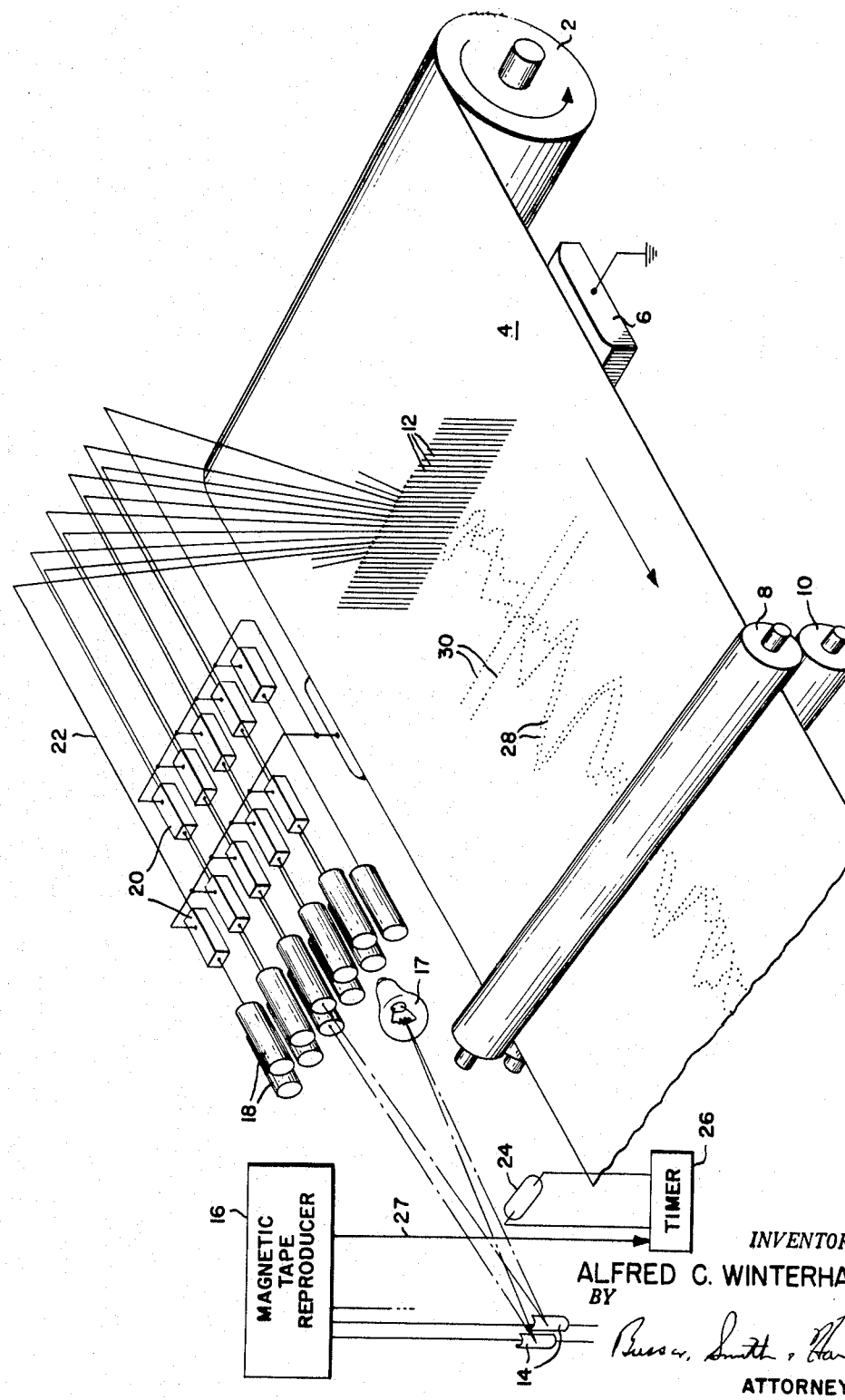
INVENTOR.
ALFRED C. WINTERHALTER
BY
ATTORNEYS

United States Patent Office 3,233,244
Patented Feb. 1, 1966

3,233,244
APPARATUS FOR REPRODUCING SEISMIC RECORDS
Alfred C. Winterhalter, Beaumont, Tex., assignor to Sun Oil Company, Philadelphia, Pa., a corporation of New Jersey
Filed Aug. 11, 1961, Ser. No. 130,980
3 Claims. (Cl. 346—23)

This invention relates to an oscillographic recorder which is particularly adapted to the reproduction and/or recording of seismic records.

In the seismic prospecting art, an ultimate objective is to provide visual records of seismic signals for expert evaluation. For this purpose it is usually desirable that a group of records from separate detectors should be displayed side by side, and for ease of interpretation it is generally desirable that these records should have their zero axes close together so that the signal traces having a common time scale overlap in their amplitude ranges, giving rise to a "shadow" effect which facilitates identification of corresponding "events," such as reflections, in the several traces. Originally, in this art, it was customary to record directly photographically the amplified outputs of the detectors, thus producing an original record, following development, which was visual. Since, to obtain optimum records, filtering and other treatments of the signals were desirably involved between the detector and the recorder, an ultimate record reflected such treatments, and if other treatments of the signals were indicated as more desirable reshooting would be required. It was found that with the development of magnetic recording it was more advantageous to record magnetically the raw signals from the detectors and then, in a laboratory, reproduce the records, providing filtering, time delays, variable relative time displacements, etc., in the reproducing operations, the original magnetic record being always available for different treatment of the signals during reproduction. Both the old and new practices, however, eventually ended up in photographic records involving the side by side and overlapping amplitude traces. The production of the photographic records was always expensive and time-consuming. Modified photographic systems, not requiring development, but utilizing very bright illumination have been proposed, but the materials are expensive and the records are subject to rapid fading. Movable pen and ink devices for reproduction have also been proposed, but because of mechanical inertia reproduction is slowed down involving correspondingly larger filter and similar elements, and the apparatus involved is also complicated due to the fact that the desired overlapping traces are not producible in a fashion in which events corresponding to the same time are reproduced simultaneously; in other words, the several traces must be reproduced with time delays, giving rise to possibility of considerable error under the practical circumstances necessitating many traces to be produced on the same record.

It is a general object of the present invention to provide for the production of a visual record which is immediately or substantially immediately visible upon recording, and in which, particularly, traces are produced which have their waves overlapping in range. This result is achieved by the use of electrosensitive recording paper marked by an array of styli located at right angles, or otherwise transverse, to the direction of advance of the record paper, these styli providing marking currents in response to energization of individual photosensitive devices responding to a multiple signal type of oscillograph.

The attainment of this general object, as well as other objects particularly relating to details of construction and arrangement will become apparent from the following description, read in conjunction with the accompanying drawing which is a diagrammatic perspective view of a preferred type of apparatus which may be used.

A supply reel of electrosensitive paper is indicated at 2, from which the paper 4 is drawn lengthwise by feed rollers 8 and 10 over a grounded member 6. Styli in the form of insulated wires located close together are disposed in a straight line transverse to the direction of movement of the paper, and have their exposed lower ends either in contact with the paper or closely adjacent thereto depending upon the particular nature of the recording procedure.

Numerous types of electrosensitive paper may be used, these being well-known in the recording art. First, there are papers which are marked by current flow at relatively low voltages between the styli 12 and the grounded member 6 through the paper. Such papers are generally marked electrolytically, being more or less moist and carrying on their sensitive surfaces materials which are changed in color by electrolytic action, i.e. through the production of acid or alkaline ions which effect color changes in indicators or by the production or destruction of the original coating material. If the coating consists of salts and indicators the action will be obvious. If the coating comprises a colored ferrocyanide and a neutral salt, the formation of alkali by electrolysis at the lower end of the styli 12 may produce a bleaching action to give white traces against a colored background. Numerous materials of this type are well known requiring only minute current flows for marking at very high rates of marking.

A second class of papers comprises those which are marked by higher voltages producing spark or arc action. Some of these effect marking by burning or heating. Others provide marking through disruptive spark action which may destroy, for example, a thin light coating overlying a black or dark background, thus exposing the latter. Here again numerous types of papers are available and well known. In still a third type of system electrostatic charges may be produced which may be immediately "developed" by the passage of the paper through a chamber provided with a dust which settles selectively on the charged areas and may be fixed by the immediate application of heat which softens a theromplastic coating.

In the case of all of the above recording systems, there is produced immediately or substantially immediately a visible record due to current flow.

In the oscillographic recorder in accordance with the present invention there is provided a multiple trace oscillograph means which is conventionalized at 14 as involving galvanometer elements such as focusing mirrors which are displaced by individual signal input currents in the usual fashion. These are indicated as being driven from a magnetic tape reproducer 16 and as arranged to provide sweeps of illumination along a path along which are disposed photosensitive elements 18, illumination being provided from a common constantly illuminated lamp such as 17.

The photosensitive devices indicated at 18 may be individually very small, consisting, for example, of phototransistors which may be of any of many known types. These are arranged in sequence along the path of deflection of the light beams from the elements 14, and in order to locate a large number of these closely they may be staggered as indicated in the drawing in two or more layers, in which case the illuminating beam may be narrow in the direction of its deviations but elongated, as by the cylindrical elements illustrated, in a direction transverse to their movements. Accordingly, as a beam traverses the array of photosensitive devices they will be successively illuminated so that illumination of any one of them corresponds to a particular amplitude of deviation of a beam. As will become shortly evident, a plurality of these photosensitive devices may be simultaneously illuminated, by a single beam as well as by all of the beams, and at a single instant a single photosensitive device may well be illuminated by two or more of the beams.

The photosensitive devices are connected individually through individual amplifiers 20 and connecting lines 22 to the styli 12, the connections being made so that the sequence of styli 12 and photosensitive devices 18 are in the same order. In order to give a quantitative indication of a practical arrangement, there may, for example, be provided a bank or array of 240 phototransistors such as 18 with a corresponding number of styli 12, to provide recording of, for example, 24 to 30 channels of seismic signals represented by such number of oscillograph galvanometer elements 14. While this involves a correspondingly large number of amplifiers 20, one for each photosensitive device, these amplifiers are all of the same type and may be of transistor type utilizing printed circuits to reduce their bulk and minimize cost of manufacturing.

If the recording is of the type requiring currents at low voltage, the amplifiers are of a corresponding type, and may have a response ranging from direct current through a sufficiently high frequency to amplify properly pulses of short duration. Alternatively, the illumination from the lamp 17 may be chopped at a suitable frequency, for example, by interposition in the path of illumination of a rapidly rotating slotted wheel, in which case the amplifiers may be of alternating type with a final rectifying stage to provide direct current, though pulsating, flow through the styli and record paper. A pulse system of this type is, of course, particularly desirable if high voltages producing sparks or arcs are required, in which case suitable output transformer arrangements may be used. Very high voltages may, of course, be produced under control of the photosensitive devices 18 by providing, at the outputs of the amplifiers, blocking oscillators, controlled by the signals. In any of these many possible cases the result is the production of currents of suitable magnitude to cause each stylus to provide a mark upon the illumination of its corresponding photosensitive device 18.

The input to the oscillograph elements 14 may, of course, be provided directly from a seismic detector. More usually, however, in accordance with the present practices, these elements will be driven by signal current resulting from reproduction of a magnetic tape, and the reproducer indicated at 16 may be of various types including numerous elements as may be desired. In conformity with present practice, for example, the magnetic record may be a multichannel tape on which each channel corresponds to a particular detector signal in the form of a modulated carrier record. This record may be amplitude, frequency, phase or pulse modulated by the seismic signal, and the reproduced signals therefrom will be demodulated to recover the original seismic signals. These, in turn, may then be variably subjected to filtering, time delays, time displacements, or the like, to provide the ultimate signals to the oscillograph elements 14 which provide the sweeps, one for each channel, along the array of photosensitive elements 18.

Indicated at 24 is a flash type lamp which is operated by a timer 26. If signals are provided to the elements 14 at the time of detection by seismic detectors, the timer 26 may be the one which establishes original time intervals but if a magnetic record as described above is being reproduced, this will usually carry in addition to the seismic signal channel, time pulses produced at the time of original recording, and these may control the timer 26 through a connection 27 to a pickup responding to the time markings. In such case the timer may merely consist of a pulse former responding to the time markings and adapted to provide short duration pulses of illumination from the lamp 24. As these energize the photosensitive devices, all of the styli will be simultaneously energized to provide dotted time markings 30 across the record sheet 4.

From the foregoing the general operation will be evident. The individual oscillograph elements 14 will produce beam deviations which are dependent on the magnitude of the seismic signals (in original or modified form), and as the several beams, one corresponding to each channel move across the array of devices 18 the corresponding styli will be energized to provide markings. As the sheet 4 advances there will thus be outlined in dots curves as indicated at 28 providing visual reproductions of the signals belonging to the various channels. In order to keep the signal reproductions identifiable, initial adjustments will be made in the oscillograph so that the base or zero lines are slightly spaced in the illumination of the photosensitive devices and corresponding in the reproduction from the styli 12. Nevertheless, the waveforms which appear will overlap in a transverse direction across the record sheet 4 with the corresponding production of visual records from which corresponding events in the various channels may be effectively recognized, the only difference in the reproduction, as compared with the conventional photographic reproduction, being that the various traces are provided by dots rather than continuous lines. The amplifying system, of course, will be so adjusted that whenever a particular device 18 is illuminated the output to a corresponding stylus will rise above a threshold value for marking, whereas an absence of illumination will produce an absence of marking. Under these conditions it is immaterial that a device 18 may be illuminated through the positioning of more than one element 14. It is also immaterial whether or not the marking is of greater density because of this.

Reference has been made particularly to a mirror type of oscillographic multiple trace means represented by the elements 14 (it being understood, of course, that the oscillograph should embody electrical adjustment means and other optical elements to secure proper illumination of the devices 18). A multi-gun cathode ray oscilloscope is equally unable, in which case the photosensitive devices may be located in contact with or closely adjacent to the screen of the tube. If, as they usually would be, they are arranged in multiple banks, the "spot" on the tube corresponding to each gun thereof should be sufficiently elongated (by electro-optical adjustment or by high frequency sweep) to illuminate all layers of the staggered devices 18.

Where reference is made to a luminous output signal, there is not necessarily implied visibility of this signal since the illumination may be infra-red or ultra-violet. In fact, if a special oscilloscope tube is used, the elements 18 may be incorporated therein in the form of electrodes and directly energized by impingement of the electron beams.

It will be evident that various details of arrangement and elements may be changed without departing from the invention as defined in the following claims.

What is claimed is:

1. In combination, signal reproducing means of a type providing simultaneously a plurality of luminous output signals traversing in overlapping relation a predetermined path in accordance with an in response to independent input signals thereto so that the positions of said output signals along said path are representative of said input signals, and array of photosensitive devices disposed along said path to provide electrical output signals selectively in accordance with the position of said luminous output signals along said path, means for advancing a record member of a type adapted to be marked by currents introduced thereto, an array of styli disposed adjacent to said record member and transversely of the direction of advance of said record member, said array of styli being arranged in the same relative relationship transversely of said record member as said array of photosensitive devices are arranged along said predetermined path, means individually connecting said photosensitive devices to said styli in correspondence with said relative relationship therebetween to provide currents from said styli to mark said record member in response to said electrical output signals for producing, simultaneously, traces on said record member corresponding to said luminous output signals and having overlapping ranges corresponding to the overlapping relation of said luminous output signals, and means for producing time markings on said record member at spaced intervals including means for intermittently illuminating a plurality of said photosensitive devices simultaneously.

2. In combination, signal reproducing means of a type providing simultaneously a plurality of luminous output signals traversing in overlapping relation a predetermined path in accordance with an in response to independent input signals thereto so that the positions of said output signals along said path are representative of said input signals, an array of photosensitive devices disposed along said path to provide electrical output signals selectively in accordance with the position of said luminous output signals along said path, means for advancing a record member of a type adapted to be marked by currents introduced thereto, an array of styli disposed adjacent to said record member and transversely of the direction of advance of said record member, said array of styli being arranged in the same relative relationship transversely of said record member as said array of photosensitive devices are arranged along said predetermined path, means individually connecting said photosensitive devices to said styli in correspondence with said relative relationship therebetween to provide currents from said styli to mark said record member in response to said electrical output signals for producing, simultaneously, traces on said record member corresponding to said luminous output signals and having overlapping ranges corresponding to the overlapping relation of said luminous output signals, said signal reproducing means comprising a plurality of galvanometer elements movable in accordance with variations in said input signals and including light reflecting members, means providing a source of light directed onto said light reflecting members, said light reflecting members being constructed to reflect light from said source onto said photosensitive elements, and means for producing time markings on said record member at spaced intervals including means for intermittently illuminating substantially all of said photosensitive devices simultaneously.

3. In combination, signal reproducing means of a type providing simultaneously a plurality of luminous output signals traversing in overlapping relation a predetermined path in accordance with and in response to independent input signals thereto so that the positions of said output signals along said path are representative of said input signals, an array of photosensitive devices disposed along said path to provide electrical output signals selectively in accordance with the position of said luminous output signals along said path, means for advancing a record member of a type adapted to be marked by currents introduced thereto, an array of styli disposed adjacent to said record member and transversely of the direction of advance of said record member, said array of styli being arranged in the same relative relationship transversely of said record member as said array of photosensitive devices are arranged along said predetermined path, means individually connecting said photosensitive devices to said styli in correspondence with said relative relationship therebetween to provide currents from said styli to mark said record member in response to said electrical output signals for producing, simultaneously, traces on said record member corresponding to said luminous output signals and having overlapping ranges corresponding to the overlapping relation of said luminous output signals, said signal reproducing means comprising a plurality of galvanometer elements movable in accordance with variations in said input signals and including light reflecting members, means providing a source of light directed onto said light reflecting members, said light reflecting members being constructed to reflect light from said source onto said photosensitive elements, said array of photosensitive devices comprising a plurality of rows of phototransistors, and each said light reflecting means being constructed to reflect a beam of light elongated to span all the rows of said phototransistors.

References Cited by the Examiner
UNITED STATES PATENTS

| | | | |
|---|---|---|---|
| 2,355,128 | 8/1944 | Whitlock | 346—33 |
| 2,432,303 | 12/1947 | Fox | 346—33 |
| 2,501,791 | 3/1950 | Silverman | 346—33 |
| 2,594,767 | 4/1952 | Green | 346—33 X |
| 2,730,694 | 1/1956 | Williamson | 346—49 X |
| 2,769,680 | 11/1956 | Beck | 346—49 |
| 2,818,172 | 12/1957 | Mills | 346—50 X |
| 2,825,621 | 3/1958 | Alexander | 346—109 X |
| 2,907,621 | 10/1959 | Eisler et al. | |
| 2,930,669 | 3/1960 | Licklider | 346—49 X |
| 3,012,839 | 12/1961 | Epstein et al. | |
| 3,050,580 | 8/1962 | Schwertz. | |

LEO SMILOW, *Primary Examiner.*

EMIL ANDERSON, *Examiner.*